(12) United States Patent
Park et al.

(10) Patent No.: US 10,629,201 B2
(45) Date of Patent: Apr. 21, 2020

(54) APPARATUS FOR CORRECTING UTTERANCE ERROR OF USER AND METHOD THEREOF

(71) Applicants: Hyundai Motor Company, Seoul (KR); Kia Motors Corporation, Seoul (KR)

(72) Inventors: Sung Soo Park, Seoul (KR); Jae Min Joh, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 104 days.

(21) Appl. No.: 15/933,753

(22) Filed: Mar. 23, 2018

(65) Prior Publication Data

US 2019/0180741 A1 Jun. 13, 2019

(30) Foreign Application Priority Data

Dec. 7, 2017 (KR) ........................ 10-2017-0167665

(51) Int. Cl.
*G10L 15/22* (2006.01)
*G10L 15/26* (2006.01)
(Continued)

(52) U.S. Cl.
CPC ............ *G10L 15/22* (2013.01); *G06F 40/284* (2020.01); *G06F 40/295* (2020.01); *G10L 15/02* (2013.01);
(Continued)

(58) Field of Classification Search
CPC ......... G10L 15/22; G10L 15/02; G10L 15/10; G10L 15/1815; G10L 15/26; G10L 15/14;
(Continued)

(56) References Cited

U.S. PATENT DOCUMENTS

| 7,647,225 B2 * | 1/2010 | Bennett ................. G10L 15/005 704/251 |
| 7,933,399 B2 * | 4/2011 | Knott .................... H04M 3/493 379/211.02 |

(Continued)

FOREIGN PATENT DOCUMENTS

KR 10-2010-0111164 A 10/2010

*Primary Examiner* — Mohammad K Islam
(74) *Attorney, Agent, or Firm* — Morgan, Lewis & Bockius LLP (57) ABSTRACT

An apparatus configured for correcting an utterance error of a user, which is configured for extracting a sematic frame with high accuracy even though the utterance of the user is incomplete, and a method thereof may include a voice activity detector configured to extract a voice after distinguishing a voice part and a mute part in a user utterance; a voice recognizer configured to output a text corresponding to the voice extracted by the voice activity detector after recognizing the voice; a named-entity recognizer configured to recognize a named entity of each text output from the voice recognizer; a text normalizer configured to normalize each text based on the named entity of each text recognized by the named entity recognizer; and a text determiner configured to determine a final text among normalized texts.

16 Claims, 10 Drawing Sheets

(51) Int. Cl.
*G10L 15/10* (2006.01)
*G10L 15/18* (2013.01)
*G10L 15/02* (2006.01)
*G06F 40/284* (2020.01)
*G06F 40/295* (2020.01)

(52) U.S. Cl.
CPC .......... *G10L 15/10* (2013.01); *G10L 15/1815* (2013.01); *G10L 15/26* (2013.01)

(58) Field of Classification Search
CPC ... G10L 15/197; G06F 17/278; G06F 16/632; H04M 3/527
See application file for complete search history.

(56) References Cited

U.S. PATENT DOCUMENTS

| | | | | |
|---|---|---|---|---|
| 7,983,401 | B1* | 7/2011 | Krinsky | H04M 3/527 379/88.23 |
| 8,675,842 | B2* | 3/2014 | Franklin-Barr | H04M 1/64 379/100.03 |
| 9,575,963 | B2* | 2/2017 | Pasupalak | G06F 17/27 |
| 10,063,701 | B2* | 8/2018 | Kumar | G10L 15/19 |
| 10,154,144 | B2* | 12/2018 | Casasola | H04M 3/527 |
| 10,191,987 | B2* | 1/2019 | Hart | G06F 16/951 |
| 2003/0026409 | A1* | 2/2003 | Bushey | H04M 3/493 379/211.02 |
| 2003/0171926 | A1* | 9/2003 | Suresh | H04M 3/4938 704/270.1 |
| 2007/0118374 | A1* | 5/2007 | Wise | G10L 15/26 704/235 |
| 2009/0037382 | A1* | 2/2009 | Ansari | H04L 67/20 |
| 2010/0114564 | A1* | 5/2010 | Kesireddy | G10L 15/22 704/10 |
| 2011/0179032 | A1* | 7/2011 | Ceusters | G06F 17/2775 707/737 |
| 2013/0163746 | A1* | 6/2013 | Wick | H04M 3/5166 379/265.14 |
| 2013/0166303 | A1* | 6/2013 | Chang | G06F 16/7834 704/258 |
| 2014/0214541 | A1* | 7/2014 | Pasila | G06Q 30/0267 705/14.55 |
| 2016/0125878 | A1* | 5/2016 | Lim | G10L 15/22 704/235 |
| 2016/0337516 | A1* | 11/2016 | Runyan | H04M 3/4935 |
| 2017/0061443 | A1* | 3/2017 | Wolf | G06Q 30/016 |
| 2017/0318156 | A1* | 11/2017 | Bao | H04M 3/527 |
| 2018/0020093 | A1* | 1/2018 | Bentitou | H04M 3/4365 |
| 2018/0068031 | A1* | 3/2018 | Hewavitharana | G06F 16/9535 |
| 2018/0233141 | A1* | 8/2018 | Solomon | G01S 5/18 |
| 2018/0314689 | A1* | 11/2018 | Wang | G06F 17/2785 |
| 2019/0082043 | A1* | 3/2019 | Lavian | H04M 1/2473 |
| 2019/0251959 | A1* | 8/2019 | Engles | G06N 3/006 |

\* cited by examiner

APPARATUS FOR CORRECTING UTTERANCE ERROR OF USER AND METHOD THEREOF

CROSS-REFERENCE TO RELATED APPLICATION

The present application claims priority to Korean Patent Application No. 10-2017-0167665, filed on Dec. 7, 2017, in the Korean Intellectual Property Office, the entire contents of which is incorporated herein for all purposes by this reference.

BACKGROUND OF THE PRESENT INVENTION

Field of the Present Invention

The present invention relates to an apparatus configured for correcting an utterance error of a user and a method thereof, and more particularly, to a technology of correcting an utterance error of a user such that the utterance of a user is accurately recognized even though the utterance is incomplete in an interactive voice recognition system, where the utterance refers to a language in units of sentence uttered through the mouth of the user.

Description of Related Art

In general, various devices are disposed in a vehicle. In recent years, devices for the convenience of a driver and passengers have been continuously developed and disposed. For example, as well as an audio device, an air conditioner, and the like, a navigation system that guides a route to a destination by locating the vehicle through a satellite or the like has been disposed in almost all vehicles.

However, although such convenience devices provide various conveniences to the driver and passengers, the driving concentration of the driver deteriorates in a process of operating the convenience devices while driving, so that the driver is distracted, increasing the risk of accidents. To solve such a problem, there has recently been developed an interactive voice recognition system, which recognizes a voice of a driver when the driver commands in his voice without need to directly manipulate the convenience devices and controls various convenience devices according to the voice command of the driver.

According to the related art, when the utterance of a user is immature, for example, the user does not speak right at the input time or stumbles while speaking like "Guide to that . . . Hyundai Motor", "Guide to Hyundai. Hyundai Motor", or "Guide to Hyu-Motor No Hyundai Motor", an interactive voice recognition system does not normally recognize the correct destination "Hyundai Motor" by recognizing it as "That Hyundai Motor", "Hyundai Hyundai Motor", or "Hyundai No Hyundai Motor".

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus configured for correcting an utterance error of a user which can extract a semantic frame from a text, which is a result of recognizing a user voice, determine a named entity of each voice in the semantic frame, and normalize a text of a corresponding voice based on each named entity to determine a final text, such that the sematic frame is extracted with high accuracy even though the utterance of the user is incomplete, and a method thereof.

The technical objects of the present invention are not limited to the above-mentioned one, and the other unmentioned technical objects and advantages will become apparent from the following description. Also, it may be easily understood that the objects and advantages of the present invention may be realized by the units and combinations thereof recited in the claims.

In accordance with an aspect of the present invention, there is provided an apparatus configured for correcting an utterance error of a user, which may include: a voice activity detector configured to extract a voice after distinguishing a voice part and a mute part in a user utterance; a voice recognizer configured to output a text corresponding to the voice extracted by the voice activity detector after recognizing the voice; a named-entity recognizer configured to recognize a named entity of each text output from the voice recognizer; a text normalizer configured to normalize each text based on the named entity of each text recognized by the named entity recognizer; and a text determiner configured to determine a final text among normalized texts.

The text normalizer may generate a list including the normalized texts. The text determiner may search a map database (DB) for each text on the list as a search word and determine a text to be searched as a destination as the final text.

The named entity recognizer may identify a demonstrative pronoun, a negative, a brand name, and a proper noun as named entity of each text or a combination of the texts.

The text normalizer may delete the demonstrative pronoun, a duplicate word, or a negative and a word preceding the negative from each text and the combination of the texts.

When a negative is included in a secondary input user utterance during verification of a primary user utterance normally input, the text normalizer may further perform a function of correcting the primary user utterance by use of a word following the negative.

The user utterance may be transmitted from a vehicle terminal.

In accordance with another aspect of the present invention, there is provided a method of correcting an utterance error of a user, which may include: extracting a voice after distinguishing a voice part and a mute part in a user utterance; outputting a text corresponding to the extracted voice after recognizing the extracted voice; recognizing a named entity of each output text; normalizing each text based on the named entity of each recognized text; and determining a final text among normalized texts.

The normalizing of the text may include generating a list including the normalized texts. The determining of the final text may include searching a map database (DB) for each text on the list as a search word to determine a text to be searched as a destination as the final text.

The recognizing of the named entity may include identifying a demonstrative pronoun, a negative, a brand name, and a proper noun as a named entity of each text or a combination of the texts.

The normalizing of the text may include deleting the demonstrative pronoun from each text and the combination of the texts, deleting a duplicate word from each text and the combination of the texts, and deleting a negative and a word preceding the negative from each text and the combination of the texts.

The normalizing of the text may further include performing correcting a primary user utterance by use of a word following a negative when the negative is included in a secondary input user utterance during verification of the primary user utterance normally input.

The user utterance may be transmitted from a vehicle terminal.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the contrary, the invention(s) is/are intended to cover not only the exemplary embodiments of the present invention, but also various alternatives, modifications, equivalents and other embodiments, which may be included within the spirit and scope of the invention as defined by the appended claims.

Hereinafter, various exemplary embodiments of the present invention will be described more specifically with reference to the accompanying drawings. Throughout the specification, it is noted that the same or like reference numerals denote the same or like components even though they are provided in different drawings. Furthermore, in the following description of the present invention, a detailed description of known functions and configurations incorporated herein will be omitted when it may make the subject matter of the present invention rather unclear.

Furthermore, terms, such as first, second, A, B, (a), (b) or the like may be used herein when describing components of the present invention. The terms are provided to distinguish the elements from other elements, and the essences, sequences, orders, and numbers of the elements are not limited by the terms. Furthermore, unless defined otherwise, all terms used herein, including technical or scientific terms, have the same meanings as those generally understood by those skilled in the art to which the present invention pertains. The terms defined in the generally used dictionaries should be construed as having the meanings that coincide with the meanings of the contexts of the related technologies, and should not be construed as ideal or excessively formal meanings unless clearly defined in the specification of the present invention.

Figure 1:
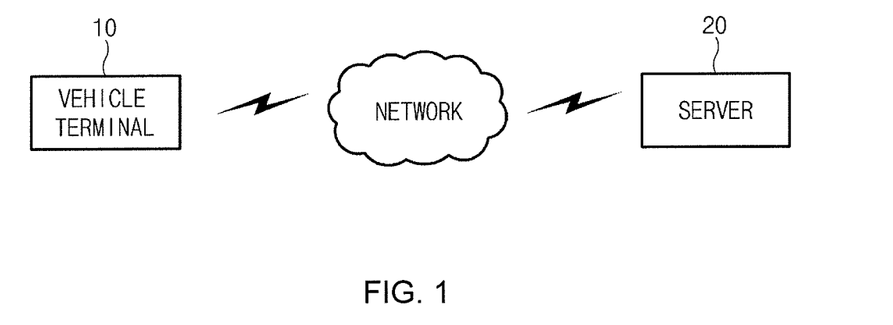
FIG. 1 is a block diagram illustrating one example of an interactive voice recognition system to which an exemplary embodiment of the present invention is applied.

FIG. 1 is a block diagram illustrating one example of an interactive voice recognition system to which an exemplary embodiment of the present invention is applied.

As illustrated in FIG. 1, an interactive voice recognition system to which an exemplary embodiment of the present invention includes a vehicle terminal 10 and a server 20.

First, the vehicle terminal 10 may be disposed in a vehicle to provide a user interface and may provide an isolated language voice recognition function.

Figure 2:
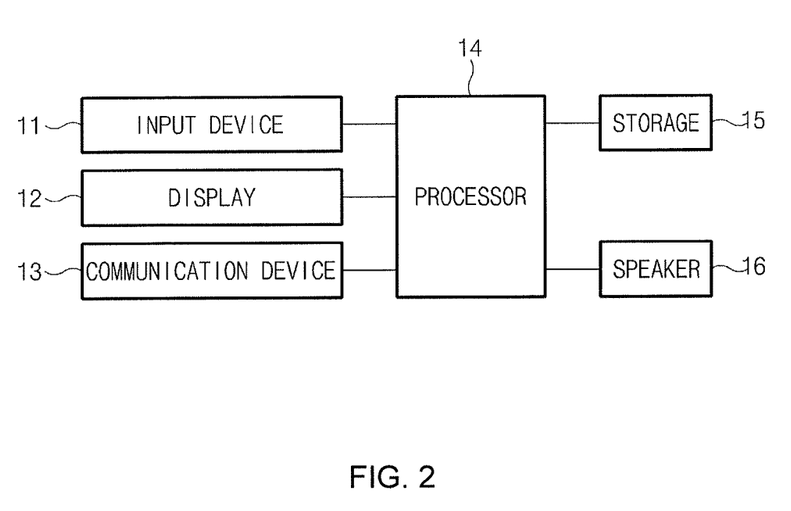
FIG. 2 is a block diagram illustrating one example of a vehicle terminal used for an exemplary embodiment of the present invention.

As illustrated in FIG. 2, the vehicle terminal 10 may include an input device 11, a display 12, a communication device 13, a processor 14, a storage 15 and a speaker 16.

The input device 11 may receive a user voice. For example, the input device 11 may include a microphone and convert a user voice into an electrical signal to transmit the electric signal to an isolated language voice recognition engine when the user voice is input. The input device 11 may be disposed on the center fascia area of the dashboard of a vehicle or on the steering wheel, but the exemplary embodiment is not limited thereto. The input device 11 may be disposed at any position within the vehicle if the user voice is easily received.

The display 12 may display an image showing an operation state of the vehicle, a navigation image, an infotainment program image, and the like. For example, the display 12 may display a result image of an operation of the vehicle according to an input user voice. The display 12 may include various display devices including a liquid crystal display (LCD), a light emitting diode (LED), a plasma display panel (PDP), an organic light emitting diode (OLED), a cathode ray tube (CRT), and the like. Meanwhile, when the display 12 is provided with a touch screen, the display 12 may receive a touch input by a user.

The communication device 13 may communicate with an external device (e.g., a remote vehicle, an infrastructure, a server, etc.) through a network. For example, the communication device 13 may transmit/receive a message to/from an external device.

Furthermore, the communication device 13 may transmit the user voice input through the input device 11 to the server 20 to recognize the user voice.

The communication device 13 may include at least one of a mobile communication module, a wireless Internet module, and a short range communication module.

The mobile communication module 112 may transmit and/or receive data to and/or from the server through a mobile communication network which is configured according to technical standards or communication methods for mobile communications (e.g., Global System for Mobile Communication (GSM), Code Division Multi Access (CDMA), Code Division Multi Access 2000 (CDMA 2000), Enhanced Voice-Data Optimized or Enhanced Voice-DATA Only (EV-DO), Wideband CDMA (WCDMA), High Speed Downlink Packet access (HSDPA), High Speed Uplink Packet Access (HSUPA), Long Term Evolution (LTE), and Long Term Evolution-Advanced (LTE-A)).

The wireless Internet module, which is a module for wireless Internet access, may transmit/receive various data through a communication network configured according to a wireless Internet technology.

Examples of such a wireless Internet technology include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless Internet module may transmit/receive data according to at least one of such wireless Internet technologies and other Internet technologies as well.

The short range communication module which is a module for short range communication may support the short range communication by use of at least one of Bluetooth™, Radio Frequency Identification (RFID), Infrared Data Association (IrDA), Ultra-Wideband (UWB), ZigBee, Near Field Communication (NFC), Wireless-Fidelity (Wi-Fi), Wi-Fi Direct, and Wireless Universal Serial Bus (Wireless USB).

The processor 14 may control the overall operation of the vehicle. For example, the processor 14 may control various operations including an operation related to the driving control of the vehicle, an entertainment related operation, a communication related operation, a navigation related operation, an audio and video related operation, an air conditioning related operation, and the like. For example, the processor 14 may control the operations of each component disposed in the vehicle based on an operation command transmitted from an isolated language voice recognition engine provided in the vehicle 10 or a large vocabulary voice recognition engine provided in the server 10.

The processor 14, which is a software module for performing the above-described operations, may include an app event manager, a connected car operating system (ccOS) application programming interface (API), a context awareness engine, an isolated language voice recognition engine, and the like.

The app event manger monitors the status of the vehicle and all events occurring in an app.

The ccOS API includes an API interworking with a voice recognition engine of a terminal, an API interworking with a voice recognition engine of a server, a context awareness engine API, and a smart agent (server) interworking API.

The context awareness engine recommends or suggests a situation data based service, processes an operation step by applying a situation analysis result to a user command recognition result, and performs a function including reordering by applying the situation analysis result to search information.

The isolated language voice recognition engine may perform isolated language voice recognition as a relatively simple voice recognition function.

The storage 15 may store various data related to the vehicle, various data related to the vehicle user, and the like. For example, the storage 15 may store driving history data of the vehicle, navigation related data, a user schedule, data related to personal information, and the like.

The storage 15 may include at least one type of a storage medium among memories of a flash memory type, a hard disk type, a solid state disk type, a silicon disk drive type, a multimedia card micro type and a card-type (e.g., SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The speaker 16 may output a sound source under the control of the processor 14. For example, the speaker 16 may output a sound source required to perform an audio function, a navigation function, and the like.

The vehicle terminal 10 according to an exemplary embodiment of the present invention may recognize the user voice and perform an operation corresponding to the user voice by executing an operation command corresponding to the recognized voice. For example, the vehicle terminal 10 may perform operations including destination using reservation, a navigation destination setting, message transmission/reception, a question answer, information search, etc., corresponding to a result of recognizing a user voice, but the exemplary embodiment is not limited thereto.

Figure 3:
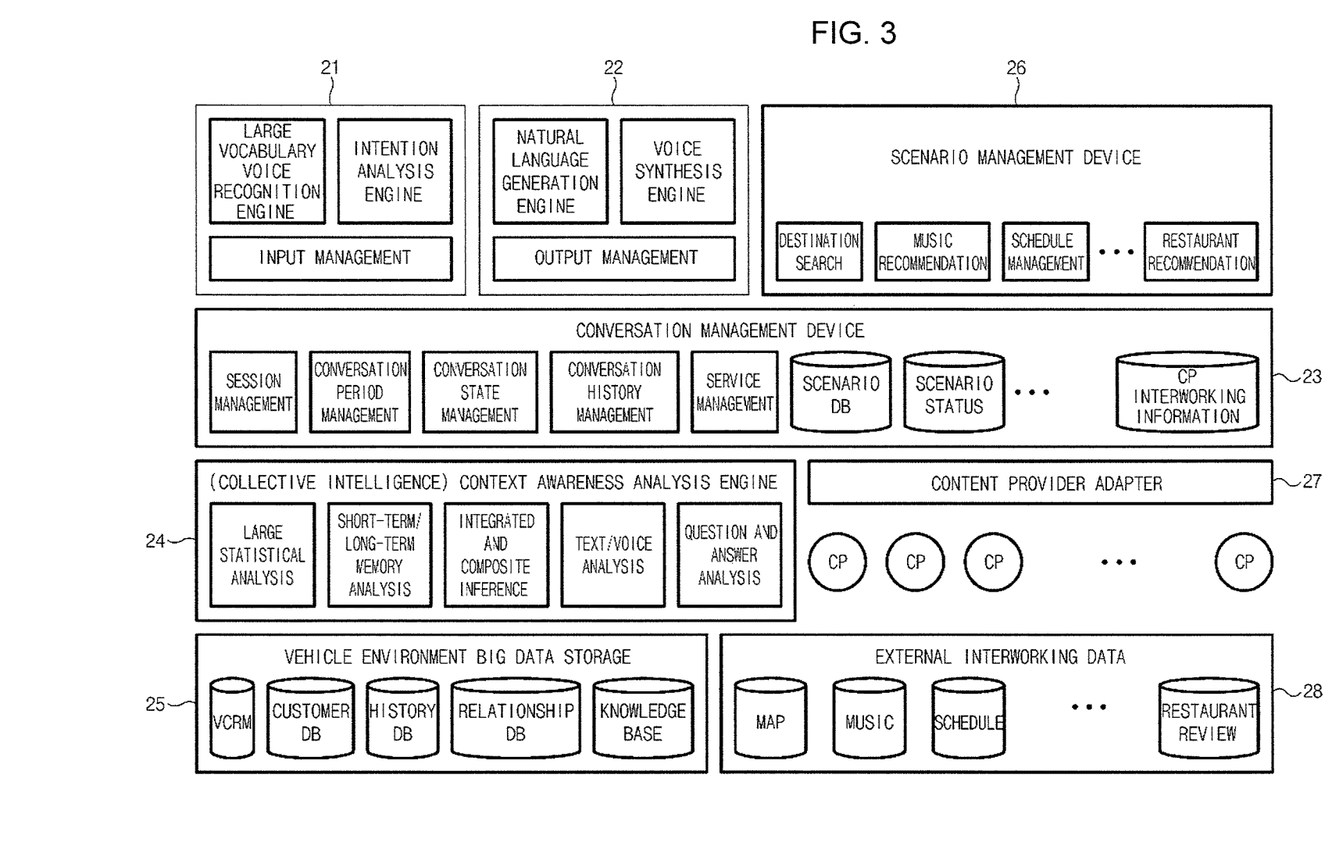
FIG. 3 is a block diagram illustrating one example of a server to which an exemplary embodiment of the present invention is applied.

Next, the server 20 is connected to a network and operates as a smart agent. As illustrated in FIG. 3, to provide an interactive voice recognition function, the server 20 may include an input management device 21, an output management device 22, a conversation management device 23, a context awareness analysis engine 24, a vehicle environment big data storage 25, a scenario management device 26, a content provider (CP) adapter 27, an external interworking data storage 28, and the like.

The input management device 21 is provided with a large vocabulary voice recognition engine to convert the user voice into a text. The input management device 21 is provided with an intention analysis engine to extract a semantic frame from the text, which is a voice recognition processing result, by utilizing a natural language processing scheme and extract key information (Entity) related to the meaning of the semantic frame.

The output (action) management device 22 includes a natural language generation engine to generate a text of an action corresponding to a voice recognition result, and analyzes the content of the generated text to generate a synthesis-related parameter.

Furthermore, the output management device 22 includes a voice synthesis engine to convert the text generated by the natural language generation engine into a voice. In the instant case, the voice synthesis engine performs a synthesis function based on the parameter.

The conversation management device 23 may manage the continuity of the semantic frame as session management, manage the addition and deletion of the semantic frame as conversation addition management, manage the state of the semantic frame as conversation state management, manage the semantic inter-frame association as conversation history management, manage service connected to the semantic frame as service management, and manage scenario database, scenario status, contents provider (CP) interworking, and the like.

The context awareness analysis engine 24 may analyze a usage pattern based on usage history as a large statistical analysis, restore association information based on the usage history as short-term or long-term memory analysis, connect different information as integrated or composite inference, analyze voice information and text information as text or voice analysis to infer context, and analyze a question as question and answer analysis to infer a connected answer.

The vehicle environment big data storage 25 may include an automobile customer relationship management (VCRM) DB in which vehicle usage information is recorded, a customer DB in which service subscription customer information is recorded, a history DB in which service usage history information is recorded, a relationship DB in which data relationship information and data interworking information are recorded, and a knowledge base in which knowledge information necessary for a query response is recorded.

The scenario management device 26 manages scenarios (destination search, music recommendation, schedule management, restaurant recommendation, etc.) for the vehicle service.

The content provider adapter 27 receives external interworking data 28 from a content provider. Such external interworking data 28 may include a map, music, a schedule, a restaurant review, and the like.

The above-described interactive voice recognition system, which is a system based on a vehicle connected to a network, is a technology known generally and widely in the art.

Hereinafter, a technique applied to the server 20 to correct an utterance error of a user will be described more specifically.

Figure 4:
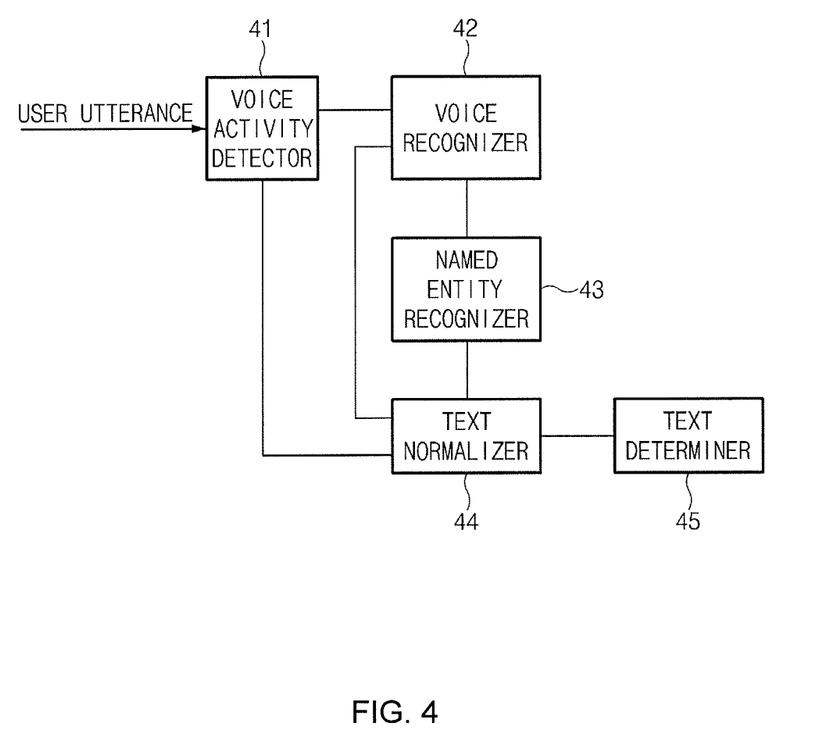
FIG. 4 is a block diagram illustrating one example of an apparatus configured for correcting an utterance error of a user according to an exemplary embodiment of the present invention.

FIG. 4 is a block diagram illustrating one example of an apparatus configured for correcting an utterance error of a user according to an exemplary embodiment of the present invention.

As illustrated in FIG. 4, an apparatus configured for correcting an utterance error of a user according to an exemplary embodiment of the present invention may include a voice activity detector 41, a voice recognizer 42, a named entity recognizer 43, a text normalizer 44 and a text determiner 45. According to a scheme of implementing an exemplary embodiment of the present invention, elements may be combined with each other to be one unit, and some elements may be omitted according to a scheme of implementing an element of the present invention. Each element of the apparatus configured for correcting an utterance error of a user may be implemented in hardware or software, or a combination of hardware and software. When each element is implemented in software, the functions of each element may be stored in a memory in a form of a program, and a processor operating as a controller may completely perform the function of each element based on the program.

First, describing each element, the voice activity detector 41, which is a hardware or software module that performs a function (Voice Activity Detection) for distinguishing voice and silence in speech uttered by a user, extracts voice from the user utterance, where the utterance which is a language in units of sentence output through the mouth of the user includes a voice part and a mute part.

Furthermore, the voice activity detector 41 may extract the voice from the user utterance transmitted from the vehicle terminal 10.

The voice recognizer 42 recognizes the voice extracted by the voice activity detector 41 and outputs a text corresponding to the voice. The voice recognizer 42 may recognize voice in various manners well-known in the art.

The named entity recognizer 43 recognizes a named entity of each text output from the voice recognizer 42 and a named entity of a result of combining of texts. In the instant case, since the result of combining texts is a text, each text should be understood as a concept including a non-combined text and a combined text.

The named entity recognizer 43 may identify a demonstrative pronoun, a negative, a brand name, and a proper noun as a named entity of each text. Such a technique of recognizing a named entity is also well-known in the art, and any method generally known in the art may be utilized.

The text normalizer 44 normalizes each text based on the named entity of each text recognized by the named entity recognizer 43 and generates a list on which each normalized text is recorded.

That is, when a demonstrative pronoun exists in a text, the text normalizer 44 deletes the corresponding text.

Furthermore, when a duplicate word exists in each text, the text normalizer 44 deletes the duplicate word.

Furthermore, the text normalizer 44 deletes a negative and a word preceding the negative from each text.

Furthermore, the text normalizer 44 may perform linkage correction. For example, if the utterance of the user is normally input as "Guide to Hyundai Motor Nam-yang Research Institute, the utterance "Hyundai Motor Nam-yang Research Institute" is searched so that it is possible to normally set a destination. In the instant case, the interactive voice recognition system may confirm the search word to the user through the utterance "Do you want to search for Hyundai Motor Nam-yang Research Institute?", and the user may change his mind and input the utterance "Not Nam-yang Research Institute but the head office". In the instant case, the text normalizer 44 replaces "Nam-yang Research Institute" with the word "head office" following the negative "not" which is recognized by the named entity recognizer 43, in the first inputted "Hyundai Motor Nam-yang Research Institute". As the result, the search word becomes "Hyundai Motor head office" and the interactive voice recognition system may output "Do you want to search for Hyundai Motor head office?".

The text determiner 45 determines the final text in the list generated by the text normalizer 44 based on the map DB. That is, the text determiner 45 searches the map DB for each text on the list as a search term, and determines the text to be searched as the destination as the final text.

Furthermore, the text determiner 45 may determine the final text based on the music DB when the user utterance is input in relation to a music search. When the user utterance is input in relation to a schedule search, the text determiner 45 may determine the final text based on the schedule DB.

Hereinafter, a process of correcting an utterance error of a user will be described more specifically with reference to FIGS. 5 to 8.

Figure 5:
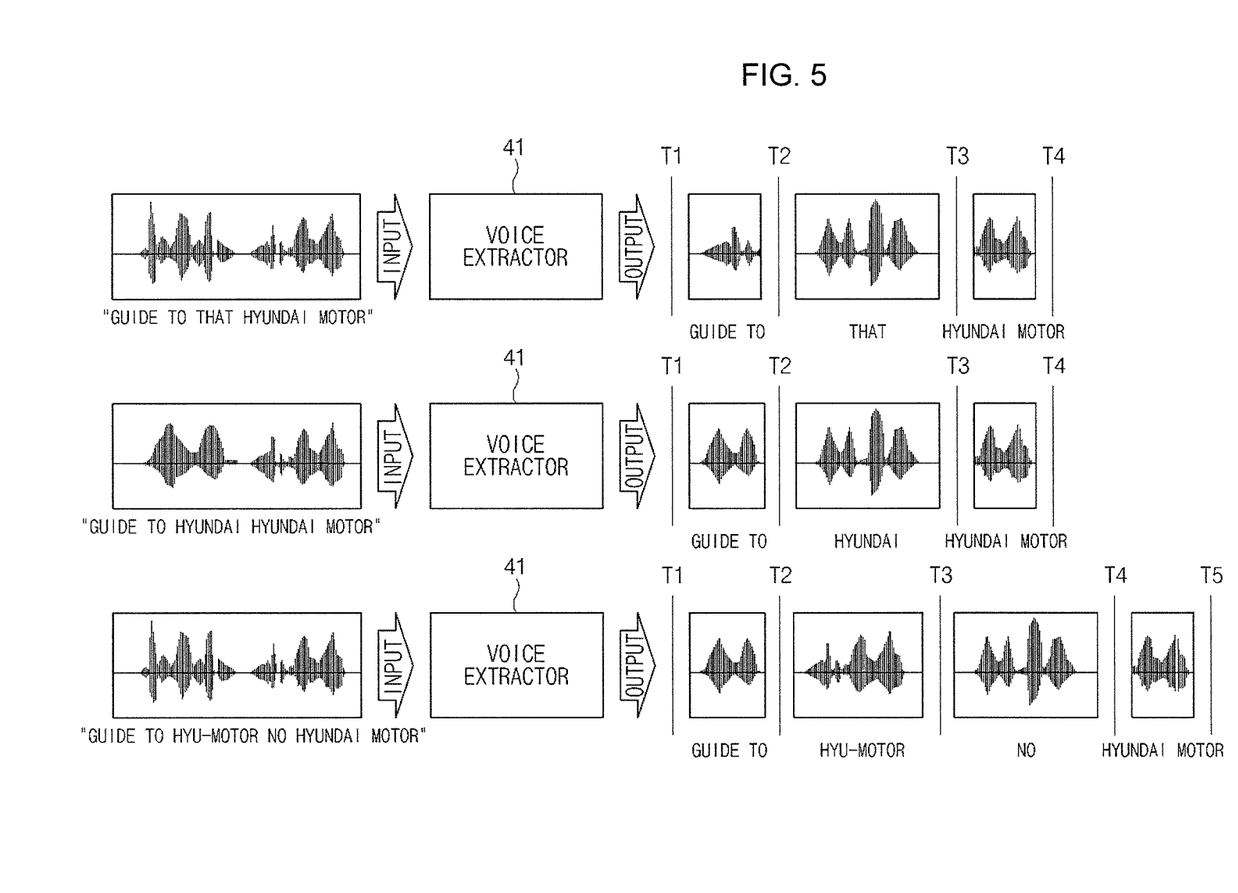
FIG. 5 is a view illustrating one example of a process of separating an utterance of a user into speech and silence by a voice activity detector of an apparatus of correcting a utterance error of a user according to an exemplary embodiment of the present invention.

FIG. 5 is a view illustrating one example of a process of separating an utterance of a user into speech and silence by a voice activity detector 41 of an apparatus of correcting an utterance error of a user according to an exemplary embodiment of the present invention.

In FIG. 5, although the user should utter "Guide to Hyundai Motor", when the user utters "Guide to that Hyundai motor" because the user cannot immediately think of "Hyundai Motor", the user utterance is input to the voice extractor 41 and the voice extractor 41 extracts the voice from the user utterance based on the VAD function. The extracted voice may include words "Guide to", "that", and "Hyundai Motor".

Furthermore, although the user should utter "Guide to Hyundai Motor", when the user stammers so that the user utters "Guide to Hyundai Hyundai Motor", the user utterance is input to the voice extractor 41 and the voice extractor 41 extracts the voice from the user utterance based on the VAD function.

Furthermore, although the user should utter "Guide to Hyundai Motor", when the user utters "Guide to Hyu-Motor (abbreviation of Hyundai Motor) No Hyundai Motor" in an unguarded moment, the user utterance is input to the voice extractor 41 and the voice extractor 41 extracts the voice from the user utterance based on the VAD function. The extracted voice includes words "Guide to", "Hyu-Motor" "No" and "Hyundai Motor".

Each extracted voice is connected to a corresponding text through the voice recognizer 42. That is, each voice is matched with the text corresponding thereto.

Figure 6:
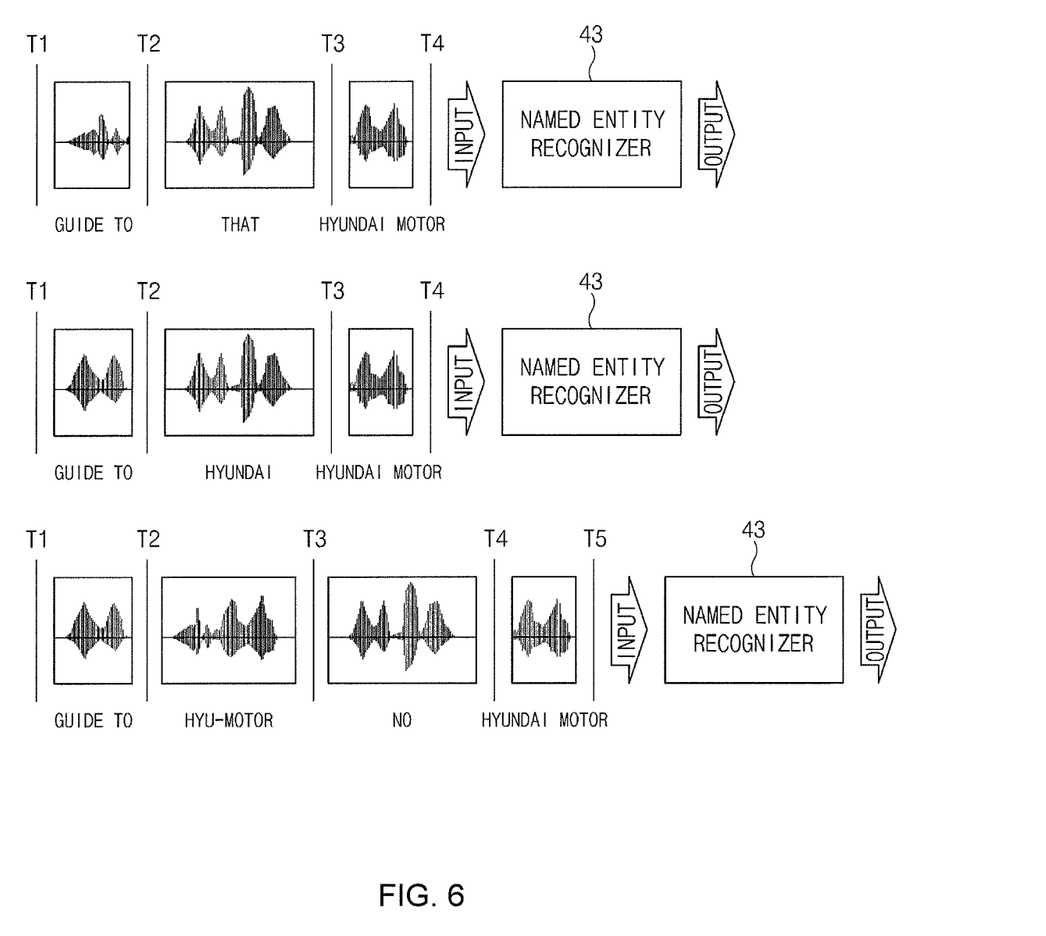
FIG. 6 is a view illustrating one example of a process of combing texts after recognizing a named entity of each text by a named entity name recognizer of an apparatus configured for correcting an utterance error of a user according to an exemplary embodiment of the present invention.

FIG. 6 is a view illustrating one example of a process of combing texts after recognizing a named entity of each text by a named entity name recognizer of an apparatus configured for correcting an utterance error of a user according to an exemplary embodiment of the present invention.

In FIG. 6, when the text output from the voice recognizer 42 includes "Guide to", "that", and "Hyundai Motor", the output is input to the named entity recognizer 43. The named entity recognizer 43 recognizes "That" as a demonstrative pronoun, "Hyundai Motor" as a brand name, and "That+Hyundai Motor" as a proper noun, based on the named entity recognition function.

Furthermore, when the text output from the voice recognizer 42 includes "Guide to", "Hyundai" and "Hyundai Motor", the output is input to the named entity recognizer 43. The named entity recognizer 43 recognizes "Hyundai" as a brand name, "Hyundai Motor" as a brand name, and "Hyundai+Hyundai Motor" as a proper noun, based on the named entity recognition function.

Furthermore, when the text output from the voice recognizer 42 includes "Guide to", "Hyu-Motor" "No" and "Hyundai Motor", the output is input to the named entity recognizer 43. The named entity recognizer 43 recognizes "Hyu-Motor" as a brand name, "No" as a negative, "Hyundai Motor" as a brand name, "Hyu-Motor+No" as a proper noun, "No+Hyundai Motor" as a proper noun, and "Hyu-Motor+No+Hyundai Motor" as a proper noun, based on the named entity recognition function.

In the instant case, the named entity recognizer 43 recognizes "Guide to" as a predicate and deletes it. Furthermore, the named entity recognizer 43 recognizes "to" as a preposition so that the named entity recognizer 43 does not take "to" into consideration when recognizing a named entity.

Figure 7:
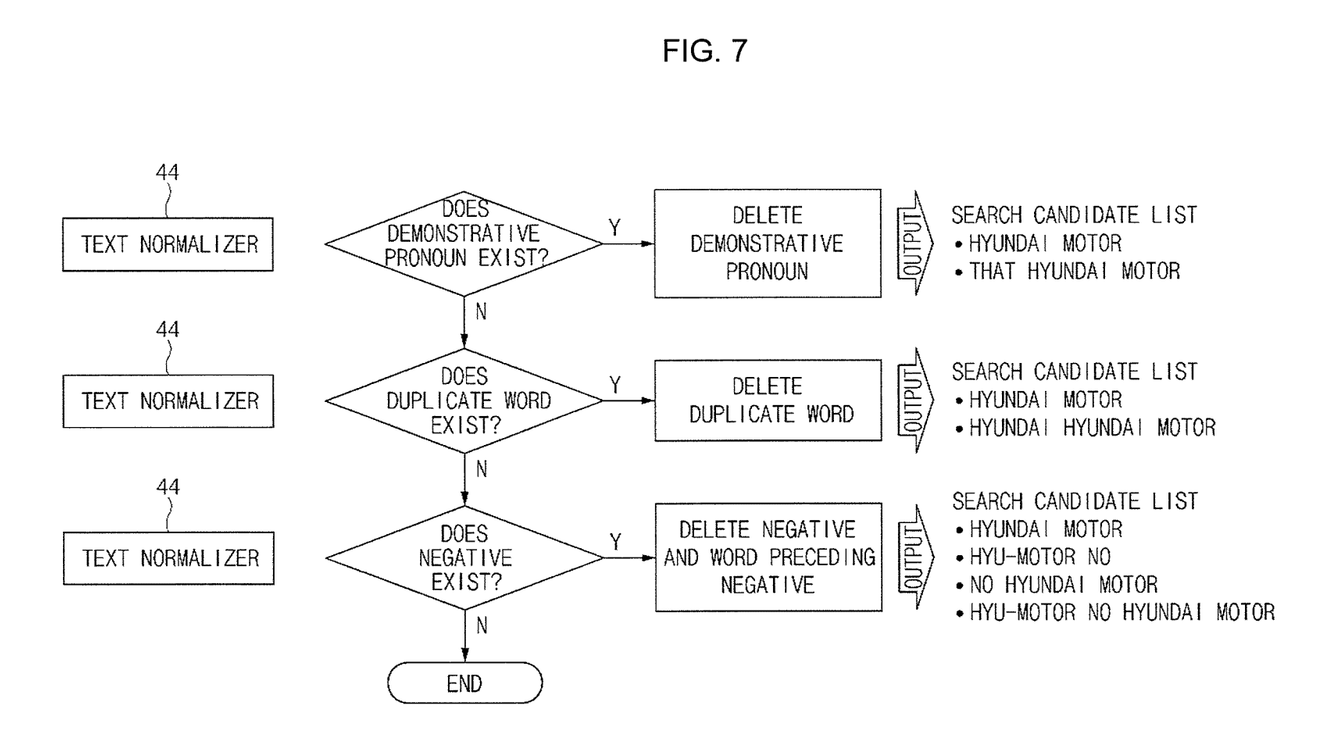
FIG. 7 is a view illustrating one example of a process of normalizing each text based on a named entity of each text by a text normalizer of an apparatus configured for correcting an utterance error of a user according to an exemplary embodiment of the present invention.

FIG. 7 is a view illustrating one example of a process of normalizing each text based on a named entity of each text by a text normalizer of an apparatus configured for correcting an utterance error of a user according to an exemplary embodiment of the present invention.

When the demonstrative pronoun "that", the brand name "Hyundai Motor", and the proper noun "That+Hyundai Motor" are input, the text normalizer 44 checks whether a demonstrative pronoun exists and removes the demonstrative pronoun. In the instant case, since the demonstrative pronoun is "That", as a normalization result, a list including "Hyundai Motor" and "that Hyundai Motor" is generated.

When the brand names "Hyundai" and "Hyundai Motor", and the proper noun "Hyundai+Hyundai Motor" are input, the text normalizer 44 checks whether a duplicate word exists and removes it. In the instant case, since the duplicate word is "Hyundai", as a normalization result, a list including "Hyundai Motor" and "Hyundai Hyundai Motor" is generated.

Furthermore, when the brand names "Hyu-Motor" and "Hyundai Motor", the negative "No", and the proper nouns "Hyu-Motor+No", "No+Hyundai Motor", and "Hyu-Motor+No+Hyundai Motor" are input, the text normalizer 44 deletes the negative and the word preceding the negative. In the instant case, since the negative is "No" and the word preceding the negative is "Hyu-Motor", as a normalization result, a list including "Hyundai Motor", "Hyu-Motor+No", "No+Hyundai Motor" and "Hyu-Motor+No+Hyundai Motor" is generated.

Figure 8:
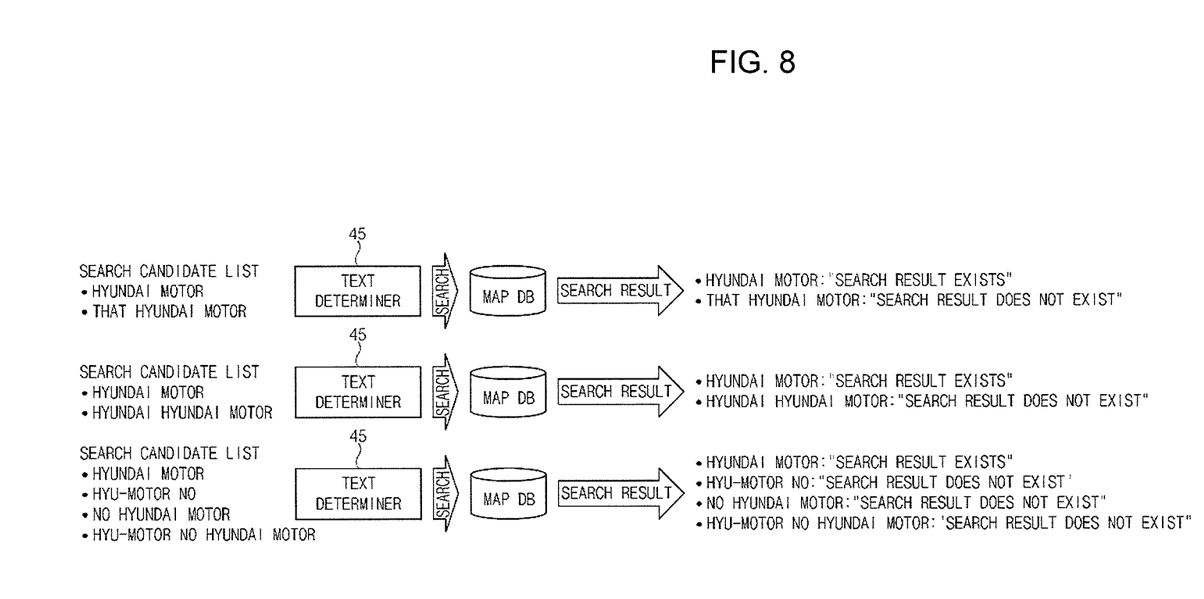
FIG. 8 is a view illustrating one example of a process of determining a final text based on a list generated by a text normalizer by a text determiner of an apparatus configured for correcting an utterance error of a user according to an exemplary embodiment of the present invention.

FIG. 8 is a view illustrating one example of a process of determining a final text based on a list generated by a text normalizer by a text determiner of an apparatus configured for correcting an utterance error of a user according to an exemplary embodiment of the present invention.

In FIG. 8, when a text on the list includes "Hyundai Motor" and "That Hyundai Motor", the text determiner 45 utilizes "Hyundai Motor" as a search word in the map DB. When the position of "Hyundai Motor" is normally detected, the text determiner 45 determines "Hyundai Motor" as the final text. In the instant case, the position of "That Hyundai Motor" may not be found.

Furthermore, when a text on the list includes "Hyundai Motor" and "Hyundai Hyundai Motor", the text determiner 45 determines "Hyundai Motor" as the final text. In the instant case, the position of "Hyundai Hyundai Motor" may not be found.

Furthermore, when a text on the list includes "Hyundai Motor", "No Hyu-Motor", "No Hyundai Motor" and "Hyu-Motor No Hyundai Motor", the text determiner 45 determines "Hyundai Motor" as the final text. In the instant case, the positions of "No Hyu-Motor", "No Hyundai Motor" and "Hyu-Motor No Hyundai Motor" may not be found.

Furthermore, after the user utterance is recognized, a semantic frame is extracted from the text output as the recognition result by utilizing a natural language processing scheme. In a general destination setting process of setting a destination based on the extracted semantic frame, when the destination corresponding to the semantic frame is not found, the apparatus configured for correcting an utterance error of a user according to an exemplary embodiment of the present invention may be activated to correct the utterance error of a user.

Figure 9:
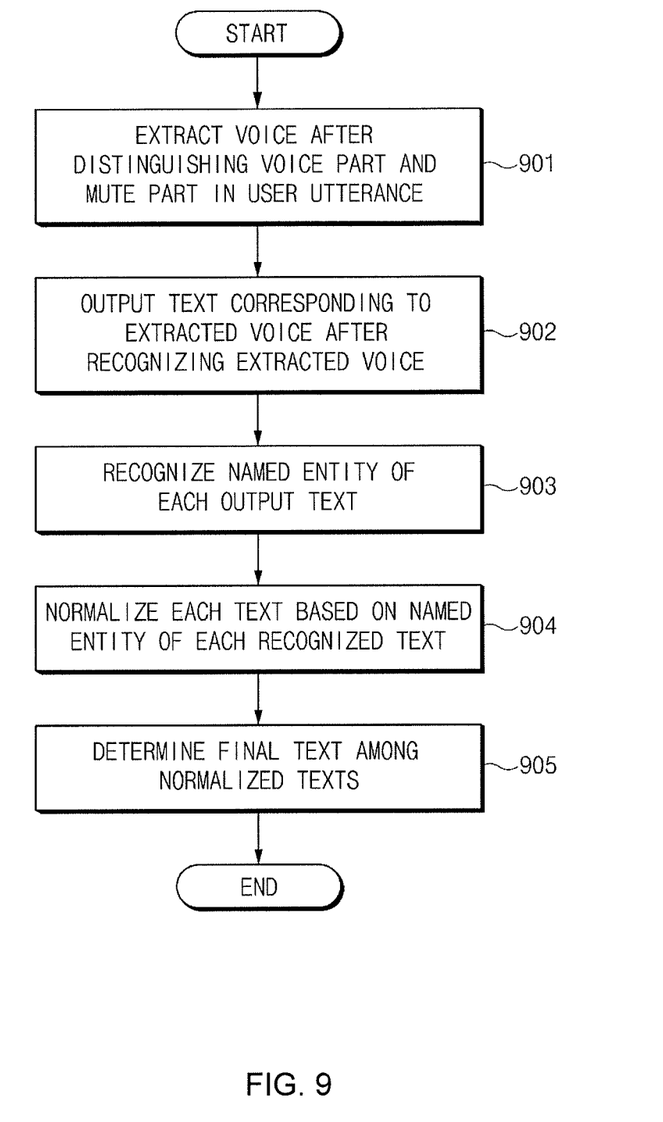
FIG. 9 is a flowchart illustrating one example of a method of correcting an utterance error of a user according to an exemplary embodiment of the present invention.

FIG. 9 is a flowchart illustrating one example of a method of correcting an utterance error of a user according to an exemplary embodiment of the present invention.

First, in operation 901, the voice extractor 41 extracts a voice after distinguishing a voice part and a mute part in a user utterance.

As such, in operation 902, the voice recognizer 42 outputs a text corresponding to the extracted voice after recognizing the voice extracted by the voice extractor 41.

As such, in operation 903, the named entity recognizer 43 recognizes a named entity of each text output from the voice recognizer 42.

As such, in operation 904, the text normalizer 44 normalizes each text based on the named entity of each text recognized by the named entity recognizer 43.

As such, in operation 905, the text determiner 45 determines the final text among the texts normalized by the text normalizer 44.

Figure 10:
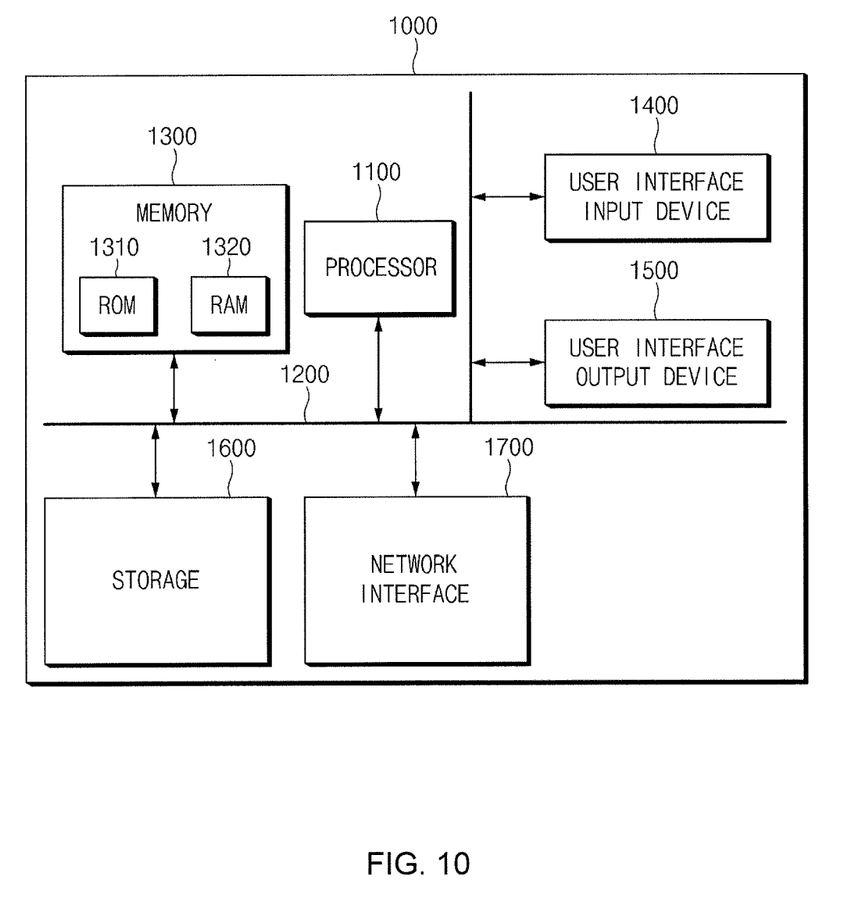
FIG. 10 is a block diagram illustrating a computing system for executing a method of correcting an utterance error of a user according to an exemplary embodiment of the present invention.

FIG. 10 is a view illustrating a computing system for executing a method of correcting an utterance error of a user according to an exemplary embodiment of the present invention.

Referring to FIG. 10, as described above, the method of correcting an utterance error of a user according to an exemplary embodiment of the present invention may be implemented through a computing system. The computing system 1000 may include at least one processor 1100 connected through a system bus 1200, a memory 1300, a user interface input device 1400, a user interface output device 1500, a storage 1600, and a network interface 1700.

The processor 1100 may be a central processing unit (CPU) or a semiconductor device that processes instructions stored in the memory 1300 and/or the storage 1600. The memory 1300 and the storage 1600 may include various volatile or nonvolatile storage media. For example, the memory 1300 may include a read only memory (ROM) and a random access memory (RAM).

Accordingly, the processes of the method or algorithm described in relation to the exemplary embodiments of the present invention may be implemented directly by hardware executed by the processor 1100, a software module, or a combination thereof. The software module may reside in a storage medium (that is, the memory 1300 and/or the storage 1600) including a RAM memory, a flash memory, a ROM memory, an EPROM memory, an EEPROM memory, a register, a hard disk, a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to an exemplary embodiment of the present invention, the sematic frame may be extracted from the voice of a user and a named entity of each voice in the semantic frame may be determined. The text of the corresponding voice may be normalized based on each named entity to determine the final text, so that the sematic frame is extracted with high accuracy even though the utterance of the user is incomplete.

Furthermore, according to an exemplary embodiment of the present invention, the sematic frame may be extracted from the voice of a user and a named entity of each voice in the semantic frame may be determined. The text of the corresponding voice may be normalized based on each named entity to determine the final text, so that the destination is recognized even though the utterance of the user is incomplete.

The above description is a simple exemplification of the technical spirit of the present invention, and the present invention may be variously corrected and modified by those skilled in the art to which the present invention pertains without departing from the essential features of the present invention.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus configured for correcting an utterance error of a user, the apparatus comprising:
   a voice activity detector configured to extract a voice after distinguishing a voice part and a mute part in a user utterance;
   a voice recognizer configured to output a text corresponding to the voice extracted by the voice activity detector after recognizing the voice;
   a named-entity recognizer configured to recognize a named entity of each text output from the voice recognizer;
   a text normalizer configured to normalize each text based on the named entity of each text recognized by the named entity recognizer; and
   a text determiner configured to determine a final text among normalized texts,
   wherein, when a negative is included in a secondary input user utterance during verification of a primary user utterance normally input, the text normalizer further performs correcting the primary user utterance by use of a word following the negative.

2. The apparatus of claim 1, wherein the text normalizer generates a list including the normalized texts.

3. The apparatus of claim 2, wherein the text determiner is configured to search a map database (DB) for each text on the list as a search word and is configured to determine a text to be searched as a destination as the final text.

4. The apparatus of claim 1, wherein the named entity recognizer identifies a demonstrative pronoun, a negative, a brand name, and a proper noun as the named entity of each text and a combination of the texts.

5. The apparatus of claim 4, wherein the text normalizer deletes the demonstrative pronoun from each text and the combination of the texts.

6. The apparatus of claim 4, wherein the text normalizer deletes a duplicate word from each text and the combination of the texts.

7. The apparatus of claim 4, wherein the text normalizer deletes the negative and a word preceding the negative from each text and the combination of the texts.

8. The apparatus of claim 1, wherein the user utterance is transmitted from a vehicle terminal.

9. A method of correcting an utterance error of a user, the method comprising:
   extracting a voice after distinguishing a voice part and a mute part in a user utterance;
   outputting a text corresponding to the extracted voice after recognizing the extracted voice;
   recognizing a named entity of each output text;
   normalizing each text based on the named entity of each recognized text; and
   determining a final text among normalized texts,
   wherein the normalizing of the text further includes:
   performing correcting a primary user utterance by use of a word following a negative when the negative is included in a secondary input user utterance during verification of the primary user utterance normally input.

10. The method of claim 9, wherein the normalizing of the text includes:
    generating a list including the normalized texts.

11. The method of claim 10, wherein the determining of the final text includes:
    searching a map database (DB) for each text on the list as a search word to deter nine a text to be searched as a destination as the final text.

12. The method of claim 9, wherein the recognizing of the named entity includes:
    identifying a demonstrative pronoun, a negative, a brand name, and a noun as the named entity of each text and a combination of the texts.

13. The method of claim 12, wherein the normalizing of the text includes:
    deleting the demonstrative pronoun from each text and the combination of the texts.

14. The method of claim 12, wherein the normalizing of the text includes:
    deleting a duplicate word from each text and the combination of the texts.

15. The method of claim 12, wherein the normalizing of the text includes:
    deleting the negative and a word preceding the negative from each text and the combination of the texts.

16. The method of claim 9, wherein the user utterance is transmitted from a vehicle terminal.

\* \* \* \* \*